(12) United States Patent
Bedel

(10) Patent No.: US 9,334,397 B2
(45) Date of Patent: May 10, 2016

(54) THERMOPLASTIC COMPOSITE MATERIAL

(76) Inventor: Laurent Bedel, Hériménil (FR)

( * ) Notice: Subject to any disclaimer, the term of this patent is extended or adjusted under 35 U.S.C. 154(b) by 0 days.

(21) Appl. No.: 13/637,649

(22) PCT Filed: Mar. 25, 2011

(86) PCT No.: PCT/FR2011/000175
§ 371 (c)(1),
(2), (4) Date: May 22, 2013

(87) PCT Pub. No.: WO2011/117484
PCT Pub. Date: Sep. 29, 2011

(65) Prior Publication Data
US 2013/0245193 A1    Sep. 19, 2013

(30) Foreign Application Priority Data

Mar. 26, 2010 (FR) .................................... 10 01239

(51) Int. Cl.
| | | |
|---|---|---|
| C08L 23/12 | (2006.01) | |
| C08K 7/00 | (2006.01) | |
| C08L 77/00 | (2006.01) | |

(52) U.S. Cl.
CPC . *C08L 23/12* (2013.01); *C08K 7/00* (2013.01); *C08L 77/00* (2013.01)

(58) Field of Classification Search
CPC ............ C08L 23/12; C08L 77/00; C08K 7/00
USPC .......................................................... 524/543
See application file for complete search history.

(56) References Cited

FOREIGN PATENT DOCUMENTS

| JP | 2000 319405 A | 11/2000 |
|---|---|---|
| JP | 2003 253138 A | 9/2003 |

OTHER PUBLICATIONS

English Machine Translation of JP 2003-253138, Sep. 10, 2003.*
Database WPI, Week 199926, Thomson Scientific, London, GB, AN 1999-309853, XP000002657718 & KR 960 012 450 B1 (Hansol Paper Co Ltd) Sep. 20, 1996.
International Search Report for corresponding PCT/FR2011/000175 issued Sep. 19, 2011.

* cited by examiner

*Primary Examiner* — Angela C Scott
(74) *Attorney, Agent, or Firm* — Susan M. Dadio; ATFirm PLLC

(57) ABSTRACT

The present invention relates to the field of thermoplastics, the synthesis thereof and the use thereof. It describes in particular the integration of light ash resulting from the combustion of waste from the paper-making industry into thermoplastic matrices. It describes in particular the manufacture and use of novel thermoplastic composite materials containing a thermoplastic resin and light ash resulting from the combustion of waste from the paper-making industry. The present invention also describes a novel filler material capable of being combines with a thermoplastic resin in the manufacture of a thermoplastic composite material.

10 Claims, 6 Drawing Sheets

THERMOPLASTIC COMPOSITE MATERIAL

Figure 1:
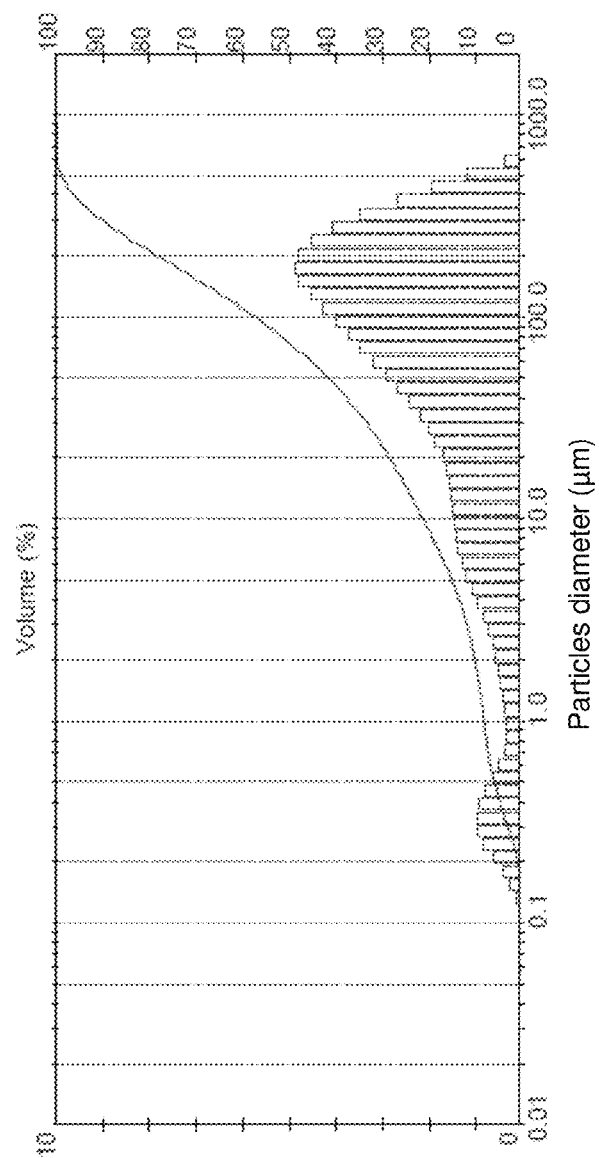

The present invention relates to the field of thermoplastics, of their synthesis and their use. It describes in particular the integration of light ashes resulting from the combustion of production waste of the papermaking industry into thermoplastic matrices. It describes in particular the manufacture and the use of novel thermoplastic composite materials containing a thermoplastic resin and light ashes resulting from the combustion of production waste of the papermaking industry. The present invention describes also a new filler material capable of being combined to a thermoplastic resin in the manufacture of a composite thermoplastic material.

A composite thermoplastic material, also called composite thermoplastic, is typically made of a base thermoplastic resin also called thermoplastic matrix, of one or more loads and, possibly, one or more plasticizers and additives. The base thermoplastic resin consists of rough polymers, copolymers or mixtures of polymers. The load(s) are typically used in the form of powders and are intended to reduce the manufacturing cost of the pieces to manufacture or to improve some of their mechanical properties. The load can be of a mineral origin (talc, clay, kaolin, silica, etc.), organic (wood flour, fruit bark flour, wood pulp, starch, etc.) or metallic (powders of flakes of aluminium, copper, zinc, etc.); the load can also be fibrous (basalt fibre, glass fibre, carbon fibre, etc.), non fibrous (balls of glass or equivalent) or also intended to promote recycling (clay, cereals, flax, etc.). The load is in general present in large, even in very great quantity; it can even be largely majority. The plasticizer(s) are present in variable quantities according to the nature of the thermoplastic matrix. One will quote as an example of plasticizers the phthalates, adipates, phosphates, polyesters, etc. The additives are generally intended to modify a specific property of the thermoplastic material and are present in small quantity.

There exist many materials, and in particular thermoplastic materials, whose synthesis envisages the use of ashes of various natures as a load. Indeed, ashes are bulky material, inexpensive, resulting from combustion of various raw and/or secondary materials, and often considered as waste thus not exploited. Moreover, said ashes are in general produced in great quantity. Indeed, the other materials usually used as loads such as the talc or the kaolin are expensive because they require an extraction and a treatment before their use.

The patent application WO 1998/042779 describes a composition containing smelt and a thermoplastic polymer and its potential utilizations. Smelt is a by-product of the chemical paper pulp industry. The residues forming this smelt are saline residues coming from the combustion of black liquors generated by the production of chemical paper pulp. According to the applicants themselves, these residues are regarded as dangerous on an environmental level, in particular because of their important content in sodium sulphide whose hydrolysis can lead to the formation of hydrogen sulphide that is commonly regarded as a poison with broad spectrum whose threshold of toxicity is of 14 $mg/m^3$ (International Program on Chemical Safety). In this thermoplastic composition, smelt is used as a foaming agent, a filler agent or a stabilizer agent. Moreover, this smelt comprising a high rate of saline residues is sensitive to moisture (hydrolysis of salts) and chemically reactive. This specific behaviour is besides put forward by the applicants who describe the reaction of present carbonated salts with an acid (tartaric or citric acid) leading to the formation of a carbon dioxide release. Said carbon dioxide release allows the expansion of the plastic matters at the molten state thus leading to alveolar pieces of which the structure is not homogeneous. This affects inevitably the mechanical properties of this plastic matters. It should be noted that a release can also be obtained without resorting to the use of acid. Indeed, the carbonates can be degraded thermically and generate carbon dioxide. For a use of this material in the field of plastics manufacturing, the formation of alveoli can be an advantage if the objective is the search for a lightening. Most often, the formation of alveoli is a disadvantage because of a degradation of the mechanical properties of the piece as well as of its aspect presenting bubbles visible to the naked eye. Furthermore, during their use for the manufacturing of objects or of materials, the thermoplastic materials are heated beyond their threshold of plasticization. This results generally in a release of water in more or less great quantity in the form of water molecules imprisoned in the polymeric network. The smelt described by the applicants containing in significant proportion chemically reactive salts, a hydrolysis of the latter is to be envisaged. This will inevitably generate reactive compounds likely to degrade the thermoplastic resin according to the invention described by the applicants. This composition based on smelt and thermoplastic polymer thus presents many disadvantages among which reduction of its mechanical properties and of its aesthetic quality due to the presence of alveoli, as well as the risk of production of toxic compounds.

The patent FR 75 01268 describes a structural material made of a mixture made up of at least one thermoplastic resin and at least one load of a mineral and/or organic nature. The share by weight of the load is at least equal to the share by weight of the thermoplastic resin in the total mixture. The thermoplastic material contains low-density polyethylene alone or in combination with other thermoplastic matters. This invention describes in particular the incorporation of various industrial wastes resulting from units of incineration of household refuse, of which ashes, as loads in this thermoplastic material. The ashes described here result from the combustion of household refuses (organic matters, plastic matters, etc.) not sorted and consequently, of all natures. As detailed above, these ashes are thus likely to give place to various chemical reactions able to lead to a deterioration of the mechanical properties and aesthetic qualities of the thermoplastic material thus obtained.

The patent application WO 2005/072188 describes a composite polymeric material containing inter alia ashes resulting from the combustion of coal, as a load. The ashes described are indifferently of light or heavy nature insofar as the required properties are those of an inorganic material in particulate form. There still, these ashes are likely to give place to various chemical reactions able to lead to a deterioration of the mechanical properties and the aesthetic qualities of the thermoplastic material thus obtained. The U.S. Pat. No. 6,916,863 and U.S. Pat. No. 6,695,902 describe composite polymers containing loads of two different natures of which one at least consists of ashes resulting from the combustion of coal and of a given granulometry. All theses patents implement only ashes resulting from the combustion of coal and do not describe any other nature of ashes because the required properties are only properties of filling or of granulometry.

The patent application WO 2008/094529 describes composite materials based on thermoplastic polymeric resins combined to loads of natural mineral origin of which volcanic ashes or ashes resulting from the combustion of coal. The composite materials present increased mechanical performances in particular in terms of inflection properties and thermal stability. The preferred resins are polyolefins. The volcanic ashes contain in particular fine particles of rocks and minerals, but also metallic particles. As evoked above, the nature of the ashes described by this patent application is particular and likely to give place to various chemical reactions able to lead to a deterioration of the mechanical properties and the aesthetical qualities of the thermoplastic material thus obtained.

Lastly, the U.S. Pat. No. 5,759,258 describes the recycling of mineral pigments resulting from the combustion of de-inking sludges. It details in particular the use of ashes resulting from the combustion of de-inking sludges which are collected then put in solution in water in the presence of calcium hydroxide ($Ca(OH)_2$). This results in obtaining a sludge containing ashes in which one make then circulate a gas mixture containing carbon dioxide. The result is the formation of precipitated calcium carbonate (PCC). This PCC is likely to be reused in the manufacturing of recycled paper as a mineral pigment. It is not envisaged to use these ashes as loads in the production of thermoplastic composite material. In addition, this process implies a system of integrated recycling allowing the combustion of sludges, the collection of ashes, the manufacturing of a new sludge and its treatment.

The present invention describes the use of particular ashes which are light ashes resulting from the combustion of production wastes from the papermaking industry. Indeed, the papermaking industry produces various types of paper pulp serving as a base for supports of various natures such as newsprint, paperboard, papers for impression and writing, etc. In a general manner, the preparation of the paper pulp consists in isolating cellulosic fibres contained in hardwood and softwood or any other ligneous plants (for example wheat straw, kenaf, bagasse) while preserving the best possible their mechanical properties. To this end, there exist two principal processes that produce two principal types of paper pulp: the chemical paper pulp and the mechanical paper pulp. The mechanical paper pulp is obtained by separating the fibres of wood by a mechanical action. One uses either abrasive grinding wheel (also called disintegrators) which grate beforehand barked wood logs, or discs equipped with plates structured in rotation between which pass gauged (calibres) wood plates resulting from the barking and the cutting of wood logs. This represents the stage of refining of wood. In order to reduce the consumption of energy and the mechanical degradation of wood fibres, it is possible to add to this procedure before the refining a phase of pre-heating of the plates with vapour. The vapour has as a function to soften the lignin that constitutes the cement of wood fibres. The separation of cellulosic fibres and lignin is thus carried out with a minimum of damaged fibres. One obtains thus a thermomechanical paper pulp (TMP) having improved mechanical characteristics. If, besides the steam, one introduces chemical agents such as sodium hydroxide (NaOH) and sulphur dioxide ($SO_2$), one obtains a chimico-thermo-mechanical paper pulp (CTMP). The mechanical paper pulp is mainly intended for the manufacturing of products requiring a low resistance such as newsprint and certain paperboards. The chemical paper pulp is manufactured by cooking the wood at high temperature in digesters in the presence of chemical products, to dissolve lignin and to release the cellulose fibres. The chemical paper pulps are used for the manufacturing of papers that offer a great mechanical resistance such as publication and writing papers for health and domestic use and certain box papers and boards.

The production of newsprint implies generally the use of mechanical or thermo-mechanical paper pulp, and/or de-inked pulp resulting from the recycling of old newspapers, magazines or advertising. These old newspapers, magazines and advertising result from selective sorting of collection with households and/or of industrial collection consisting of printing wastes and unsold of press. This sorting is made by specialized companies. In the activities of the applicant, the collected papers represent typically 60% of the raw material used for the production of newsprint. On average, this rate is higher in Europe and Asia. The recycling of collected paper in white pulp is made by implementation of a process with different stages of which the more important is the separation of ink from the mixture consisting in the cellulosic fibres and the mineral loads. This separation stage or de-inking step consists essentially of a setting in suspension of the cellulosic fibres in water and a stage of de-inking in order to eliminate the inks and the dyes. In Europe, the de-inking process the more used is the de-inking by flotation process and on the American continent, it is the de-inking by wash process that is the most widespread. Whatever the process used, at the end of the de-inking process the inks, the dyes, the cellulose fibres residues and the mineral loads form sludges. The flotation process has a relatively weak output insofar as it causes the loss of a very important quantity of matter, about 20%, which represents up to 148000 T/year. These sludges are thickened with a dryness of 67%. Once isolated and dried, the dry content of these sludges is made up of 50% of mineral loads (carbonates, talc, kaolin, silicates, titanium oxide . . . ) and of 50% of organic matter in the form of fibres and of cellulosic fragments as well as of latex, polymers, etc. These sludges are called de-inking sludges. This dry matter, considered as a terminal waste of the papermaking industry, is in general used as a fuel. One of the principles of valorisation of these de-inking sludges is thus the exploitation of their thermal properties. However the combustion of these de-inking sludges leads to obtaining two principal residues: the secondary ashes which are dense or coarse ashes withdrawn at the beginning of the circuit of smokes, and the primary or light ashes which are separated from the smokes by passage through a filter. Indeed, to increase the lower calorific value of the de-inking sludges, and thus facilitate their incineration, it can be added to them barks and crushed end-of-life wood, even natural gas. These additional fuels have little influence on the nature of the light ashes obtained after combustion of the de-inking sludges. Indeed, their combustion produces denser ashes that are easily separated from the light ashes by well-known systems for one skilled in the art. Furthermore, the mixture of fuels described above can also be supplemented by sludges resulting from the water treatment plant from the papermaking production site, and this without incidence on the quality of the light ashes obtained. Indeed, the composition of these sludges resulting from the water treatment plant from the papermaking production site is very close to that of the de-inking sludges. The combustion of theses sludges leads to obtaining heavier ashes and also to obtaining clinkers that are very heavy and non-combustible residues made up of ferrous and non-ferrous wastes.

The applicant is more particularly interested in light ashes resulting from the combustion of production wastes from the papermaking industry, in particular of de-inking sludges, and has highlighted a clear improvement of the qualities of a thermoplastic material containing the aforementioned ashes. The present invention describes the integration of light ashes resulting from the combustion of production wastes from the papermaking industry as loads in thermoplastic matrices. The present invention describes more particularly the integration of light ashes resulting from the combustion of de-inking sludges as loads in thermoplastic matrices. Indeed, it was observed in a surprising way that the integration of light ashes according to the invention allows on one hand to increase the mechanical properties of the thermoplastic matrix thus formed, but also to modify its rheological properties while bringing an addition of fluidity at the molten state. Moreover this use makes it possible to transform ultimate wastes of the papermaking industry in a secondary raw material.

In the present invention, one means by "de-inking sludge", either pure de-inking sludges such as the one described above, or a mixture of fuel containing an important proportion of de-inking sludge resulting from the papermaking industry; said mixture of fuel can contain other sludges resulting from a water treatment plant of the papermaking industry as well as barks and residues of wood. The other sludges and residues used in the mixture of fuel are all also resulting from the papermaking industry. The de-inking sludges according to the present invention will typically contain from 60% to 100% of de-inking sludges and from 0% to 40% of other fuels resulting from the papermaking industry.

The light ashes implemented in the present invention are obtained following the combustion of a mixture of fuels containing deinking sludges at a minimal temperature of 850° C. during two seconds in order to avoid the formation of dioxins. These particular conditions cause a physical and chemical transformation of the mineral loads of the fuel, and in particular a decarbonation. These light ashes do not have any reactivity due to the presence of carbonates. In addition to the fact of leading to a very significant decrease in the chemical reactivity of the ashes, in particular because of the decarbonation described above, the very high temperature used in the cycle of incineration leads also to a modification in the morphology of the flying ashes emitted. Indeed, these light ashes present a regular and spherical geometry. The association of this particular geometry and of the granulometry of ashes is responsible for the modifications of the surprising rheological behaviour of the molten polymers obtained from the aforesaid ashes. A photograph under scanning electron microscope (SEM) of the light ashes according to the present invention is reproduced in FIG. 6. It was established by our researchers that the small size of the particles of ashes as their spherical morphology induced by a thermal treatment at very high temperature allow those to be placed between the polymeric chains and thus to act on these last as the balls of a ball bearing when the polymeric matrix (or base resin) is at the supercooled state and subject to shear stresses. This is detailed in example 4 below.

The present invention concerns a composite thermoplastic material containing a thermoplastic base resin combined to light ashes resulting from the combustion of production wastes of the papermaking industry. In a preferred embodiment, the present invention describes a thermoplastic composite material containing a thermoplastic base resin combined to light ashes resulting from the combustion of de-inking sludges.

The composite thermoplastic materials according to the invention have as a base resin a thermoplastic resin selected from polyolefins (polypropylene (PP), polyethylene (PE), etc.), pokyamide (PA), polyethylene terephtalate (PET) and polybutylene terephtalate (PBT), polycarbonates (PC), polyphenylene oxide (PPO), polyoxymethylene (POM), polyamide-imide (PAI), polyetherimide (PEI), polyethersulfone (PESU) and polyetheretherketone (PEEK). The thermoplastic resins are used at a molten state and are thus likely to flow under the action of a constraint, in particular mechanical. This allows their setting in form by means of techniques well-known by one skilled in the art such as the thermoforming, the extrusion or the injection moulding.

In a particular embodiment the thermoplastic material according to the invention contains a load made up of light ashes from 1% to 99% in mass, preferentially from 10% to 50% in mass and more preferentially from 30% to 40% in mass.

The nature of the base resin used for the manufacturing of the thermoplastic material according to the invention is determined in function of the object to realize, of the techniques which will be used or of criteria of production such the efficiency of production. In function of the use for which the composite thermoplastic material is intended according to the invention, this last contains preferentially a base resin which is a polyolefin. Indeed, the thermoplastic materials made from polyolefins present very interesting properties such as great chemical inertia and an important hydrophobia. These qualities allow their current use in the food field. Among the polyolefins, a particular embodiment of the present invention implements the polypropylene (PP) as a thermoplastic resin and a preferred embodiment implements the polyethylene (PE).

In another embodiment, the composite thermoplastic material according to the invention contains a base resin which is a polyamide (PA). The polyamides are of a very common practice in particular in textile fibres, for example the nylon, but also for the manufacturing of various plastic objects.

The FIGS. 1 to 6 illustrate the mechanical and rheological particular properties of the composite materials according to the invention. The results of the corresponding experiments are described in the examples hereafter.

The FIG. 1 describes a granulometric analysis of light ashes used for the realization of the samples which will be tested as for their mechanical and rheological properties.

Figure 2:
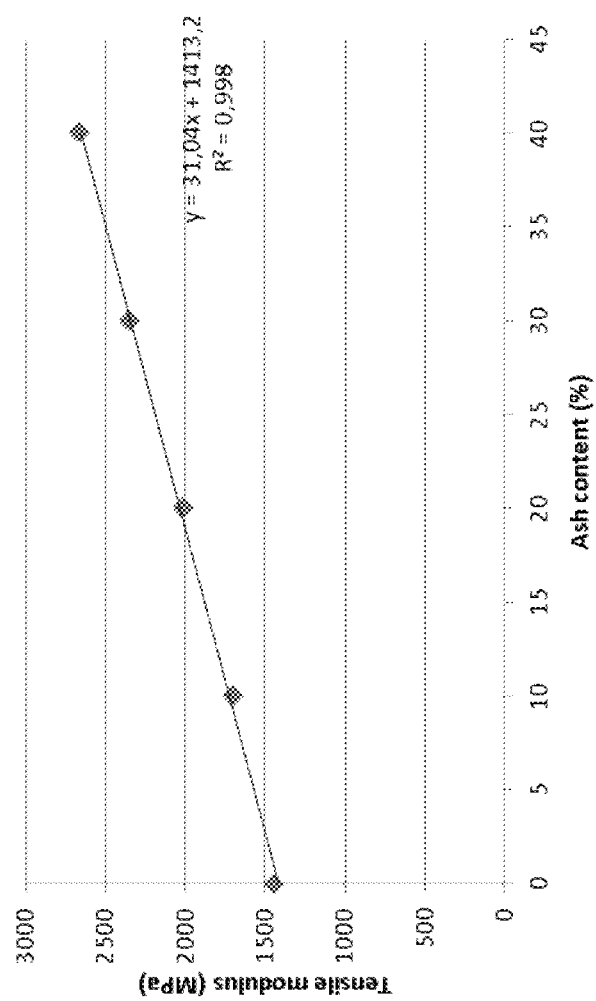

The FIG. 2 describes the evolution of the tensile modulus of the composite materials according to the invention in function of their light ashes content.

Figure 3:
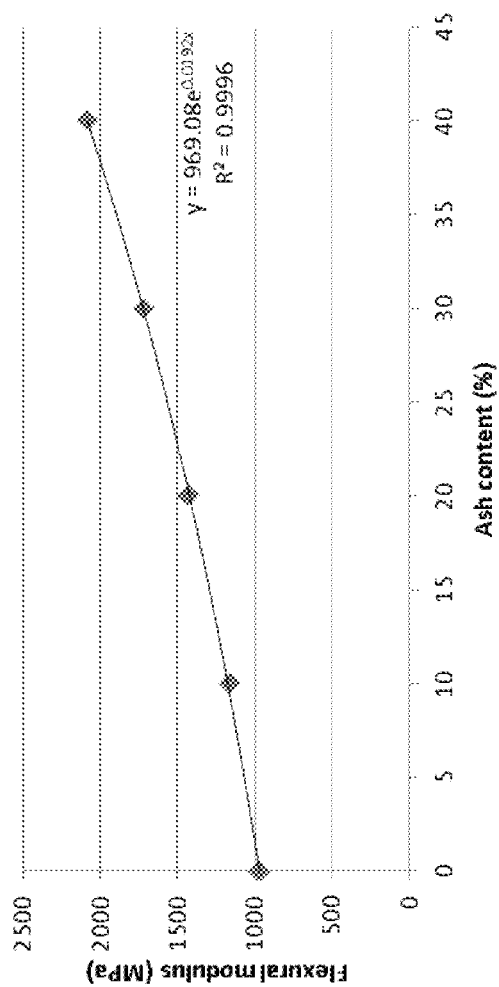

The FIG. 3 describes the evolution of the flexural modulus of the composite materials according to the invention in function of their light ashes content.

Figure 4:
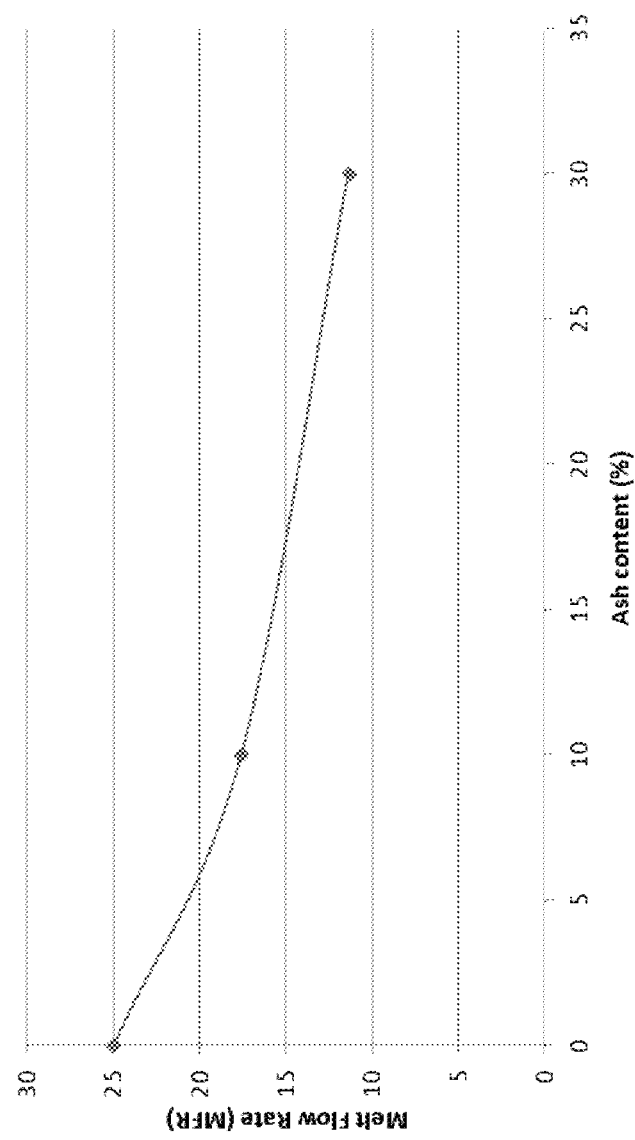

The FIG. 4 describes the evolution of the melt flow rate (MFR) of the composite materials according to the invention in function of their light ashes content.

Figure 5:
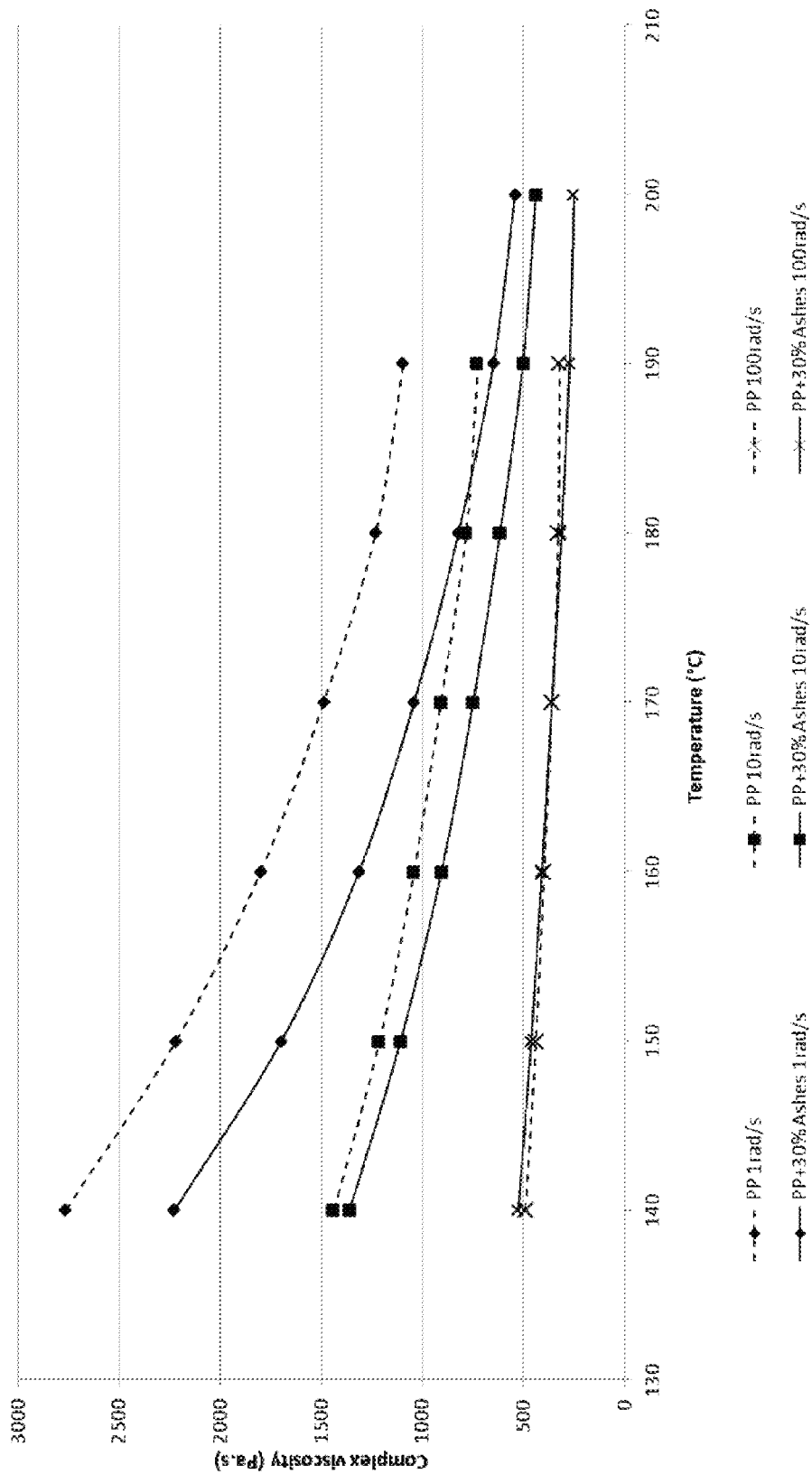

The FIG. 5 illustrates the evolution of the complex dynamic viscosity (eta*) of the composite materials according to the invention in function of their content of light ashes.

Figure 6:
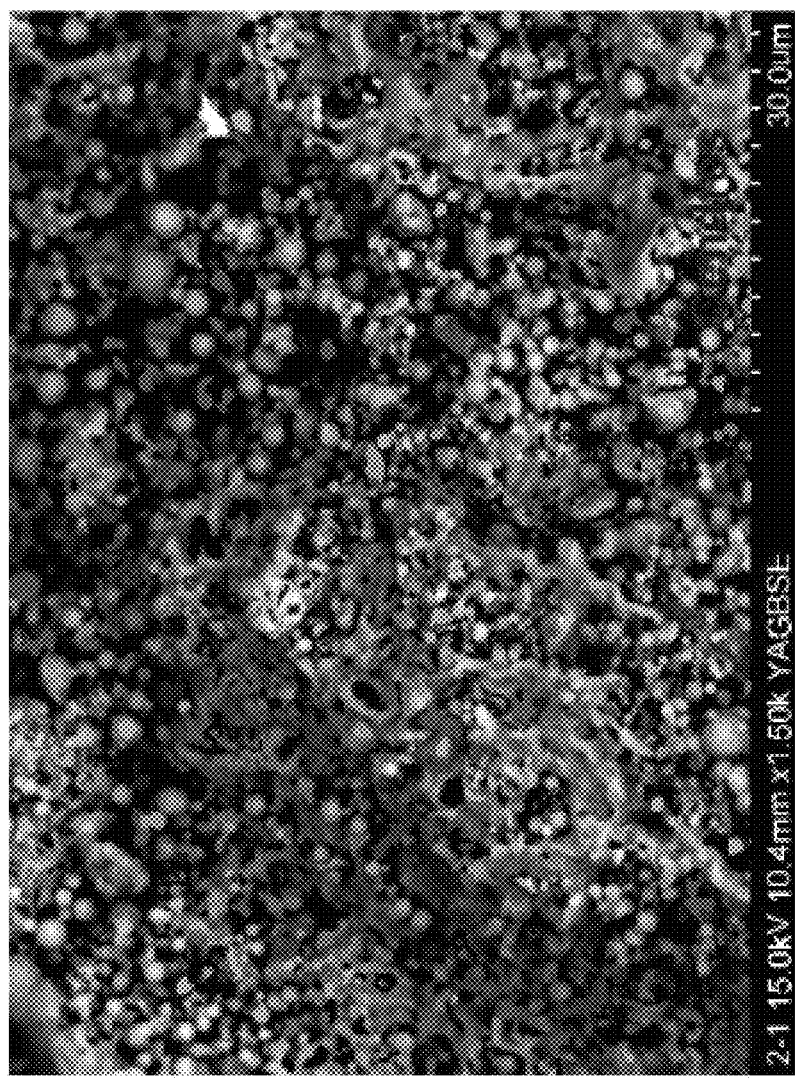

The FIG. 6 shows a scanning electron microscope (SEM) photography of the light ashes used in the present invention.

The composite thermoplastic material according to the invention can be industrially manufactured according to methods well-known by one skilled in the art. An example of a standard method of manufacturing is the combination of the resin or polymeric matrix with the load, and eventually the other constitutive elements such as the plasticizer(s) and/or the additive(s), by a mean of mixture employed commonly in the plastics industry such as mixers of the Banbury® type or a kneading machine. The load is presented in the form of ashes and the polymeric resin is presented either in the form of powder, of flakes, or of pellets. The temperature to which the operation of mixture is carried out is adapted according to the resin used and to the possible presence of plasticizers and/or additives. Once the mixture is homogeneous and the different ingredients are uniformly distributed in the mixture, the material can be exploited. The thermoplastic material obtained is used in a molten state in a stage of extrusion or of injection for example.

The improvement of the properties of the composite thermoplastic material according to the invention relates essentially on the increase in fluidity in a molten state. This allows in particular to carry out very fine and/or very small plastic pieces because the steering stresses are reduced. This allow also a gain in productivity because a better fluidity allows to carry out pieces with a constant cross-section more quickly.

The present invention presents also the interest of allowing the increase of the fluidity in a molten state of recycled polymers. Indeed, the recycled polymers present generally very low fluidity index and this constitutes a major problem within the context of an industrial valorization of these recycled polymers. The withdrawal performances observed during the stages of moulding are also improved with the composite thermoplastic material according to the invention. This is illustrated in the example 1 herebelow. The fluidity in a molten state is characterized by an index called M.F.R. (for Melt Flow Rate) which corresponds to the flowing velocity in a molten state. This index is expressed in g/10 nm at a given temperature and under given mechanical constraint (weight of 2.16 kg). For the polypropylene (PP) this temperature is typically of 230° C. Under these conditions, the Borealis® PP BH345MO virgin resin presents a M.F.R. of 45 g/10 nm. With light ashes resulting from the combustion of de-inking sludges as loads, the composite thermoplastic material thus formed will have a higher M.F.R. in the same experimental conditions. This is due on one hand to an increased density as the ashes are heavier than the plastic, therefore with an equal volume a more important matter mass will flow, and on the other hand, to the plasticizing properties of the ashes which contribute to a plasticization of the molten medium. This last effect can also be observed with microballs of glass as a load.

The present invention relates also to a product of load for composite thermoplastic material, made up of light ashes resulting from the combustion of wastes of production of the papermaking industry, in particular of de-inking sludges.

In a particular embodiment, the load is present in a proportion of 1% to 99% in mass in the composite thermoplastic material, preferentially of 10% to 50% in mass and ideally of 30% to 40% in mass.

The composite thermoplastic materials according to the invention are intended to the manufacturing of plastic materials or of objects made of plastic by all the techniques known by one skilled in the art and in particular the injection moulding, or possibly the extrusion.

These new composite thermoplastic materials presenting an increase in the fluidity in a molten state allow to carry out pieces with an increased productivity. In addition, these new materials also make it possible to realize pieces presenting very fine thicknesses and also to make transformable by injection moulding of thermoplastic resins which are not very fluid in a natural state, made up in particular by recycled polymers.

The plastic pieces of low thickness are carried out in moulds whose walls create interactions with the thermoplastic material filling it. The flow in it of molten thermoplastic material generates shear stresses which, when the walls are very close to each other, as in the typical case of moulds intended for the realization of fine pieces, can become sufficiently important to damage the polymeric resin by degrading the length of the macromolecular chains. To limit the consequences of this phenomenon, it is obvious for one skilled in the art to search for the most fluid possible thermoplastic materials or to lower considerably the injection speeds and to increase the temperature of the mould. The implementation of these two last actions indices a considerable increase of the cycle time, thus limiting the technico-economic attraction of this option.

The recycled polymers also called regenerated polymers, are generally not very fluid because of the mixture of different grades of a polymer of the same nature. One will quote for example the polypropylene whose index of fluidity (MFI) varies from 0.1 to more than 50. A recycled polypropylene presents generally a low fluidity, about 4 to 10. The addition of light ashes resulting from the combustion of production wastes from the papermaking industry and in particular of de-inking sludges according to the invention, allows to increase the fluidity of the regenerated polymers and thus to confer to them capacities of exploitation comparable with those of the most efficient virgin matrices.

When they are combined with matrices dedicated to injection moulding, the light ashes resulting from the combustion of production wastes from the papermaking industry and in particular of de-inking sludges, allow to obtain a composite thermoplastic material extremely fluid authorizing the realization of pieces of greater dimensions; and this through constant closing of press. Indeed, the increased fluidity allows a filling of the mould in a shorter time than the time necessary for the cooling of the material. Moreover, the presence of light ashes according to the invention confers on composite thermoplastic material a greater rigidity. Consequently, the pieces of great dimensions realized in this material present a more important geometrical stability.

The presence of light ashes resulting from the combustion of production wastes of the papermaking industry and in particular of de-inking sludges dispersed in the thermoplastic matrix allow thus to ensure a better dimensional stability of the realized pieces.

Furthermore, the thermoplastic material according to the invention allow to increase the productivity a the time of the realization of pieces made of thermoplastic material. Indeed, one notes an important gain of productivity at the time of the implementation of the injection-moulding technique in particular. The cycle time necessary for the moulding of a piece of a given weight is decreased. Moreover, the number of pieces injected to obtain thousand pieces without any default as well as the time for obtaining the aforesaid thousand pieces are both considerably decreased. The noted defaults are in general due to a complete filling of the mould. The thermoplastic material according to the invention has increased rheological properties, consequently it presents less problems of complete filling of the mould. An example of such productivity measurements is illustrated by example 3 and the values of table 2.

Lastly, the presence of light ashes resulting from the combustion of production wastes of the papermaking industry and in particular of de-inking sludges limits considerably the withdrawal when demolding. This means that when demolding plastic pieces such as plates, the composite thermoplastic material will retract while cooling, which will involve a shift between the dimension of the mould and the dimensions of the object thus moulded, the physical phenomenon is called withdrawal phenomenon. With a composite thermoplastic material according to the invention, the withdrawal decreases in a significative manner. Consequently, it is conceivable to use all types of moulds and not only the moulds intended for the thermoplastic materials. This property is particularly interesting in the case of the use of polyolefins which present naturally an important withdrawal. An example of such withdrawal measurements is illustrated by example 1 and the values of table 1.

The present invention concerns also a process for obtaining light ashes resulting from the combustion of production wastes from the papermaking industry in order to manufacture a thermoplastic material having increased rheological properties. Said process for obtaining light ashes comprises the following stages:
  to select a mixture of fuels resulting from the papermaking industry containing de-inking sludges,
  to burn said mixture at a minimal temperature of 850° C. during 2 seconds,
  to recolt the light ashes with a filter or a sieve.

The mixture of fuels according to the present invention contains typically de-inking sludges in major quantity, and additive fuels in the form of other sludges resulting from water treatment plant and barks and end-of-life wood that are crushed. Any other type of additional fuel is usable within the context of the present process. The mixture of fuels according to the invention contains from 60% to 100% of de-inking sludges and 0% to 40% of other fuels resulting from the papermaking industry.

The collection of light ashes does not represent any difficulty for one skilled in the art that will be able to implement the appropriate procedures such as the set in place of filters or of sieves.

The present invention describes also a recycling process of the wastes of the papermaking industry. Indeed, as evoked above, the invention makes it possible to transform ultimate wastes of the papermaking industry in a secondary raw material. This secondary raw material is likely to serve as a load in the manufacturing of composite thermoplastic materials.

The recycling of wastes is a crucial industrial challenge from an ecological, economical and technical point of view. In the industrial field, the papermaking industry is considered as an industry producing great quantities of wastes in the form of sludges, in particular of de-inking sludges, of bark and debris of wood. If the barks and the debris of wood are frequently used as fuel both on site but also in other industries, the sludges are little or not exploited. These sludges are then stored or possibly burned if their nature allows it. None of these solutions is technically satisfactory. Indeed, these solutions let remain wastes in another form and/or they are energy consuming. The possibility of transforming production wastes which are sludges, and in particular the de-inking sludges, in a raw material, thus solves a thorny problem for the papermaking industry which will thus be able to develop new sectors of exploitation.

In this objective, the present invention describes a recycling process of the sludges resulting from the papermaking industry including the following stages:
  to transform the sludges resulting from the papermaking industry in light ashes by combustion;
  to collect the aforesaid light ashes with a filter or a sieve;
  to incorporate the light ashes thus obtained in a composite thermoplastic material.

The transformation into light ashes can be carried out by the process described above, namely by combustion of the aforesaid sludges at a minimal temperature of 850° C. during 2 seconds. Any other process allowing the obtaining of ashes which are inert on the chemical level is also acceptable. Thus in preferred embodiment, the present invention relates to a recycling process for the sludges resulting from the papermaking industry including the following stages: to transform the sludges resulting from the papermaking industry into light ashes by combustion at a minimal temperature of 850° C. during 2 seconds, to collect the aforesaid ashes with a filter or a sieve, then to incorporate the light ashes thus obtained in a composite thermoplastic material.

The incorporation of the light ashes thus obtained to a thermoplastic composite material is carried out by a simple mixture or any other technique known by one skilled in the art for the manufacture of such a thermoplastic composite material.

This process allows the recycling of the sludges on the site of production itself and a further exploitation of the lights ashes thus formed. The sludges do not have to be stored anymore what represents a major advantage both ecologically and economically.

The properties of the composite thermoplastic material according to the invention will be described in a more detailed manner in the following examples. These examples are not limitative.

EXAMPLE 1

Obtaining a Thermoplastic Composite Material

The light ashes resulting from the combustion of de-inking sludges are incorporated to a level of 30% in mass to a thermoplastic resin popropylene-based (Borealis® ref. BH345MO). The mixture is carried out using an extruder with a double corotative screw of type Clextral® BC21 (length 900 nm, sleeve diameter 25 mm, distance between centres 21 mm). A profile of standard screw for the assembly of mineral loads with propylene is selected. The temperature is increased until 200° C. at the head of the extruder.

This integration of light ashes in resin polypropylene-based results in a gray colouring of the thermoplastic matrix. One form thermoplastic matter strands through an adapted grid. These snap rings are then air cooled and transformed into pellets from 2 to 3 mm in diameter.

Injection Moulding

After drying, the obtained pellets are tested in injection moulding. The injection-moulding machine presents a force of maximum closing of 275 T (Ferromatik Milacron® K-Tec 275). A test mould with double print is installed in order to carry out rectangular plates. Each print of rectangular plate has a dimension of 200×150×4 mm.

Results

The fluidity at the molten state of the thermoplastic matrix according to the invention (30% light ashes, 70% PP BH345MO) was compared with that of the virgin polypropylene resin (PP BH345MO). It arises from the observation of a reduction in the time cycle necessary to the realization of a piece in a thermoplastic material according to the invention, in constant operating conditions, that the fluidity at the molten state is increased.

Evaluation of the Withdrawal

The withdrawal during the cooling was also estimated and the results are detailed in the table 1 below:

TABLE 1 properties of the thermoplastic material according to the invention

| Material | Length | Width | Thickness |
|---|---|---|---|
| Composite thermoplastic material | 198 | 149 | 4 |
| PP BH345MO | 194 | 146 | 4 |
| Print of the mould | 200 | 150 | 4 |

It was observed that if one considers the plate obtained with the thermoplastic material according to the invention, one observes a length of 198 mm and a width of 149 mm from a mould that makes 200 mm of length and 150 mm of width. For the plate realized with the virgin resin PP BH345MO, one observes a length of 194 mm and a width of 146 mm from the same mould.

The withdrawal observed during the cooling of the realized pieces is approximately of 3% in the case of the virgin resin PP BH345MO whereas it is only of 1% in the case of the composite thermoplastic material according to the invention.

In addition, the rigidity of the plates obtained with the composite thermoplastic material according to the invention is increased compared to that of the plates realized with the virgin resin. This represents an increase in the modulus of elasticity.

EXAMPLE 2

Tensile Modulus

The determination of the tensile modulus is made on the basis of the analysis of the results of characterization in uniaxial traction according to the standard ISO 527.

The tensile modulus of polypropylene used in example 1 (Boréalis® BH453MO) is of 1600 MPa.

The tensile modulus of the composite thermoplastic material according to the invention, made up of a base resin of the type BH435MO and loaded to 30% in mass with light ashes resulting from the combustion of de-inking sludges, is located around 3000 to 4500 MPa.

EXAMPLE 3

Influence of the Fluidity Increase

The present example illustrates the influence of the increase in the fluidity of the composite material according to the invention on the productivity. Indeed, the increased rheological properties of the composite material according to the invention are likely to allow the increase of the productivity of pieces in thermoplastic material.

One measures the incidence of the rheological properties of each thermoplastic material on the productivity by carrying out two series of thousand pieces by injection moulding. One calculates the cycle time necessary to the moulding of a piece of 500 g. (polypropylene base), one counts the number of injected pieces for obtaining 1000 pieces without any defects and the time necessary for obtaining these 1000 pieces without defects. The cycle time necessary to the moulding of a piece of 500 g. is given in seconds and the time necessary for obtaining of 1000 pieces without defect is given in hours.

Results

TABLE 2 properties of the thermoplastic matrix according to the invention

| Composition | Cycle time (seconds) | Number of pieces injected for obtaining 1000 pieces without defects | Time necessary for obtaining 1000 pieces without defects (hours) |
| --- | --- | --- | --- |
| Polypropylene reference (Boréalis BH345MO) | 60 | 1052 | 17.5 |
| Composite material according to the invention (Boréalis BH345MO + 30% of light ashes) | 46 | 1012 | 13 |

It is noted that the cycle time necessary for the realization of a piece of 500 g. by injection moulding is lower in the case of the use of a composite material according to the invention. Indeed, this cycle time passes from 60 seconds for a polypropylene thermoplastic material of the type BH345MO to 46 seconds for a thermoplastic material according to the invention.

In addition, the number of pieces injected to obtain 1000 pieces without defect as well as the time necessary for obtaining said 1000 pieces without defects are considerably decreased. The moulding defects of the pieces are in general due to a bad filling of the mould. This bad filling can be provoked by a fluidity problem of the thermoplastic material at the molten state. The thermoplastic material according to the invention presents increased rheological properties, this stage of filling of the mould does not present anymore or in all the cases much less problems.

Indeed, the addition of light ashes to the polypropylene matrix facilitates the filling of the mould because of an increased fluidity. It results from this greater facility of filling that the number of defective pieces by default of complete filling of the mould is considerably reduced from 5.2% to 1.2% on one hand, and that the time necessary to moulding of a unit piece is also reduced from 60 s to 46 s, that is to say a profit of 23%, on the other hand. In addition to the saving in material realized by the limitation of the rejects of production, the time necessary to obtaining 1000 pieces without defect (integration of the improvement of the time cycle and the limitation of rejects) passes from 17.5 hours when using virgin polypropylene to 13 hours when using the same polypropylene charged with 30% of ashes according to the invention, that is to say a gain in productivity of almost 26%.

EXAMPLE 4

I. Composition of the Analysed Samples

The samples were realized from homopolymeric polypropylene DOMOLEN 1101S and from light ashes according to the invention. A granulometric analysis of light ashes is realized using a particle sizer MALVERN Mastersizer S. The results of the granulometric analysis are presented in FIG. 1.

The ashes composition was verified by X-ray diffraction.

The incorporation of ashes was realized using a twin-screw co-rotating extruder Clextral BC 21. The profile of temperature increases from 170° C. to 220° C. to facilitate the mixture of the matters then it is brought to 205° C. at the level of the threader by means of which a strand is obtained then cooled and finally reduced to pellets. The rotating speed of the screws of the extruder is of 155 rotations/minute.

Load levels of 10%, 20%, 30% and 40% were carried out. The load levels were verified by measuring the content in ashes of the composites after calcining.

II. Mechanical Properties of the Samples

The composites obtained were compared and characterized in comparison with a virgin matrix DOMOLEN 1101S.

The characteristic sizes of the behaviours in traction, in inflection and in impact resistance were obtained by respecting the operational protocols of the respective standards NF EN ISO 527-1 "Plastics—determination of the properties in traction—Part 1: General principles" and NF EN ISO 527-2 "Plastics—determination of the properties in traction—Part 2: test conditions of plastics for moulding and extrusion", NF EN ISO 178<<Plastics—determination of the properties in inflexion" and NF EN ISO 179-1<<Plastics—determination of the impact resistance Charpy—Part 1: impact test not instrumented".

A. Tensile Modulus

The results of characterization in traction are presented in tables 3 to 8.

TABLE 3 characterization in traction of virgin polypropylene DOMOLEN 1101S

| Test tubes | Maximum constraint (MPa) | Maximum elongation (%) | Rupture stress (MPa) | Elongation rupture (%) | Modulus (MPa) |
|---|---|---|---|---|---|
| W1720E1 | 34.1 | 7.8 | 27.2 | 17.9 | 1462 |
| W1720E2 | 34.1 | 8.1 | No rupture | No rupture | 1408 |
| W1720E3 | 34.0 | 8.0 | No rupture | No rupture | 1402 |
| W1720E4 | 34.1 | 7.8 | No rupture | No rupture | 1456 |
| W1720E5 | 34.3 | 7.8 | No rupture | No rupture | 1471 |
| Average | 34.1 | 7.9 | — | — | 1440 |
| Standard Deviation (SD) | 0.1 | 0.2 | — | — | 32 |

This is our control that does not contain light ashes. The tensile modulus is on average of 1440 MPa. The maximum constraint is on average of 34.1 MPa and the maximum elongation is of 7.9% on average.

TABLE 4 characterization in traction of the composite integrating 10% of light ashes

| Test tubes | Maximum constraint (MPa) | Maximum elongation (%) | Rupture stress (MPa) | Elongation rupture (%) | Modulus (MPa) |
|---|---|---|---|---|---|
| W1720A1 | 32.0 | 5.6 | 29.1 | 7.6 | 1682 |
| W1720A2 | 32.1 | 5.4 | 31.0 | 6.8 | 1699 |
| W1720A3 | 32.0 | 5.2 | 31.0 | 6.6 | 1715 |
| W1720A4 | 32.3 | 5.4 | 30.8 | 6.6 | 1699 |
| W1720A5 | 31.9 | 5.4 | 29.4 | 6.3 | 1703 |
| Average | 32.1 | 5.4 | 30.3 | 6.8 | 1700 |
| Standard Deviation (SD) | 0.1 | 0.1 | 0.9 | 0.5 | 12 |

These composite materials according to the invention contain 10% of light ashes. The medium tensile modulus is of 1700 MPa. The maximum constraint is on average of 32.1 MPa and the maximum lengthening is of 5.4% on average.

TABLE 5 characterization in traction of the composite integrating 20% of light ashes

| Test tubes | Maximum constraint (MPa) | Maximum elongation (%) | Rupture stress (MPa) | Elongation rupture (%) | Modulus (Mpa) |
|---|---|---|---|---|---|
| W1720B1 | 29.3 | 4.1 | 28.0 | 5.4 | 1954 |
| W1720B2 | 29.1 | 4.1 | 27.5 | 5.2 | 1981 |
| W1720B3 | 29.5 | 3.9 | 27.9 | 4.6 | 2011 |
| W1720B4 | 29.6 | 3.9 | 28.2 | 5.4 | 2072 |
| W1720B5 | 29.4 | 3.9 | 28.3 | 5.0 | 2045 |
| Average | 29.4 | 4.0 | 28.0 | 5.1 | 2013 |
| Standard Deviation (SD) | 0.2 | 0.1 | 0.3 | 0.3 | 47 |

These composite materials according to the invention contain 20% of light ashes. The medium tensile modulus is of 2013 MPa. The maximum constraint is on average of 29.4 MPa and the maximum lengthening is of 4.0% on average.

TABLE 6 characterization in traction of the composite integrating 30% of light ashes

| Test tubes | Maximum constraint (MPa) | Maximum elongation (%) | Rupture stress (MPa) | Elongation rupture (%) | Modulus (MPa) |
|---|---|---|---|---|---|
| W1720C1 | 25.8 | 3.0 | 24.7 | 3;9 | 2415 |
| W1720C2 | 25.7 | 3.0 | 24.2 | 3.9 | 2417 |
| W1720C3 | 26.0 | 3.0 | 24.2 | 4.5 | 2328 |
| W1720C4 | 25.6 | 2.9 | 24.9 | 3.6 | 2316 |
| W1720C5 | 25.6 | 3.0 | 24.6 | 3.7 | 2276 |
| Average | 25.7 | 3.0 | 24.5 | 3.9 | 2350 |
| Standard Deviation (SD) | 0.2 | 0.0 | 0.3 | 0.3 | 63 |

These composite materials according to the invention contain 30% of light ashes. The medium tensile modulus is of 2350 MPa. The maximum constraint is on average of 25.7 MPa and the maximum lengthening is of 3.0% on average.

TABLE 7 characterization in traction of the composite integrating 40% of light ashes

| Test tubes | Maximum constraint (MPa) | Maximum elongation (%) | Rupture stress (MPa) | Elongation rupture (%) | Modulus (MPa) |
|---|---|---|---|---|---|
| W1720D1 | 24.0 | 2.3 | 22.6 | 3.2 | 2592 |
| W1720D2 | 24.1 | 2.2 | 22.5 | 3.3 | 2700 |
| W1720D3 | 24.0 | 2.2 | 22.2 | 2.7 | 2660 |
| W1720D4 | 23.9 | 2.2 | 22.1 | 3.7 | 2690 |
| W1720D5 | 23.9 | 2.2 | 22.5 | 2.6 | 2692 |
| Average | 24.0 | 2.2 | 22.5 | 3.1 | 2667 |
| Standard Deviation (SD) | 0.1 | 0.0 | 0.4 | 0.4 | 44 |

These composite materials according to the invention contain 40% of light ashes. The medium tensile modulus is of 2667 MPa. The maximum constraint is on average of 24.0 MPa and the maximum lengthening is of 2.2% on average.

These five tables describe the characteristics of each sample compared to a control virgin from light ashes about its behaviour in traction, in inflection and in impact resistance. It is noted in particular that the tensile modulus of the composite thermoplastic materials according to the invention increase with the light ashes content incorporated. This is illustrated in FIG. 2 that shows the evolution of the tensile modulus according to the content in light ashes.

B. Flexural Modulus

The same samples as in A) above were tested about their flexural modulus. The results are presented in the tables below.

TABLE 8 characterization in inflection of virgin polypropylene DOMOLEN 1101S

| Test tube | Modulus (MPa) |
|---|---|
| W1720E1 | 1017 |
| W1720E2 | 986 |
| W1720E3 | 855 |
| W1720E4 | 1028 |
| W1720E5 | 982 |
| Average | 974 |
| Standard deviation (SD) | 69 |

For the control virgin of light ashes, the flexural modulus is on average of 974 MPa.

TABLE 9 characterization in inflection of the composite integrating 10% of light ashes

| Test tube | Modulus (MPa) |
|---|---|
| W1720A1 | 1161 |
| W1720A2 | 1131 |
| W1720A3 | 1143 |
| W1720A4 | 1219 |
| W1720A5 | 1156 |
| Average | 1162 |
| Standard deviation (SD) | 34 |

A composite material according to the invention containing 10% of light ashes presents a flexural modulus of 1162 MPa on average.

TABLE 10 characterization in inflection of a composite integrating 20% of light ashes

| Test tube | Modulus (MPa) |
|---|---|
| W1720B1 | 1456 |
| W1720B2 | 1465 |
| W1720B3 | 1384 |
| W1720B4 | 1447 |
| W1720B5 | 1393 |
| Average | 1429 |
| Standard deviation (SD) | 38 |

A composite material according to the invention containing 20% of light ashes presents a flexural modulus of 1429 MPa on average.

TABLE 11 characterization in inflection of a composite integrating 30% of light ashes

| Test tube | Modulus (MPa) |
|---|---|
| W1720C1 | 1599 |
| W1720C2 | 1732 |
| W1720C3 | 1766 |
| W1720C4 | 1689 |
| W1720C5 | 1821 |
| Average | 1721 |
| Standard deviation (SD) | 84 |

A composite material according to the invention containing 30% of light ashes presents a flexural modulus of 1721 MPa on average.

TABLE 12 characterization in inflection of a composite integrating 40% of light ashes

| Test tube | Modulus (MPa) |
|---|---|
| W1720D1 | 1991 |
| W1720D2 | 2089 |
| W1720D3 | 2092 |
| W1720D4 | 2170 |
| W1720D5 | 2087 |
| Average | 2086 |
| Standard deviation (SD) | 63 |

A composite material according to the invention containing 40% of light ashes presents a flexural modulus of 2086 MPa on average.

Conclusion: the flexural modulus evolves in function of the proportion of light ashes incorporated in the composite material according to the invention. This is illustrated in FIG. 3 that presents the evolution of the flexural modulus according to the content in light ashes.

C. Impact Resistance

The test "Charpy" is carried out on the composite materials containing 10% and 30% of light ashes according to the invention. The control DOMOLEN 11015 presents an impact resistance Charpy of 110 kJ/m$^2$.

TABLE 13 impact resistance Charpy of the composite integrating 10% of light ashes

| Test tube | W1720A1 | W1720A2 | W1720A3 | W1720A4 | W1720A5 | W1720A6 | W1720A7 | W1720A8 | W1720A9 | W1720A10 |
|---|---|---|---|---|---|---|---|---|---|---|
| h (in mm) | 3.94 | 3.95 | 3.94 | 3.94 | 3.95 | 3.94 | 3.95 | 3.94 | 3.94 | 3.93 |
| b (in mm) | 9.98 | 9.98 | 9.97 | 9.97 | 9.98 | 9.97 | 9.97 | 9.98 | 9.96 | 9.96 |
| E (in J) | 0.788 | 0.595 | 0.703 | 0.734 | 0.810 | 0.718 | 0.821 | 0.600 | 0.687 | 0.631 |
| Ec (in J) | 0.785 | 0.592 | 0.700 | 0.731 | 0.807 | 0.715 | 0.818 | 0.597 | 0.684 | 0.628 |
| $a_{cU}$ (in KJ/m$^2$) | 19.964 | 15.017 | 17.820 | 18.609 | 20.471 | 18.202 | 20.771 | 15.183 | 17.430 | 16.044 |
| Average $A_{cU}$ (KJ/m$^2$) | | | | | 18.0 | | | | | |
| Stadard deviation $A_{cU}$ (KJ/m$^2$) | | | | | 2.1 | | | | | |

The impact resistance of a composite material according to the invention containing 10% of light ashes is on average of 18.0 kJ/m$^2$.

TABLE 14 impact resistance Charpy of the composite integrating 30% of light ashes

| Test tube | W1720C1 | W1720C2 | W1720C3 | W1720C4 | W1720C5 | W1720C6 | W1720C7 | W1720C8 | W1720C9 | W1720C10 |
|---|---|---|---|---|---|---|---|---|---|---|
| h (in mm) | 3.94 | 3.94 | 3.94 | 3.94 | 3.93 | 3.94 | 3.94 | 3.94 | 3.94 | 3.94 |
| b (in mm) | 9.98 | 9.98 | 9.98 | 9.99 | 9.98 | 9.98 | 9.98 | 9.99 | 9.97 | 9.99 |
| E (in J) | 0.335 | 0.369 | 0.377 | 0.339 | 0.298 | 0.360 | 0.381 | 0.294 | 0.323 | 0.364 |
| Ec (in J) | 0.332 | 0.366 | 0.374 | 0.336 | 0.295 | 0.357 | 0.378 | 0.291 | 0.320 | 0.361 |
| $a_{cU}$ (in $KJ/m^2$) | 8.443 | 9.308 | 9.511 | 8.536 | 7.521 | 9.079 | 9.613 | 7.393 | 8.146 | 9.172 |
| Average $A_{cU}$ ($KJ/m^2$) | | | | | | 8.7 | | | | |
| Stadard deviation $A_{cU}$ ($KJ/m^2$) | | | | | | 0.8 | | | | |

The impact resistance of a composite material according to the invention containing 30% of light ashes is on average of 8.7 kJ/m².

One note thus a reduction of the impact resistance compared to a control virgin of light ashes but also according to their content in light ashes.

Conclusion: the characteristics measured in inflection and traction show that the addition of ashes in the polymeric resin increases its rigidity. This increase in rigidity results also in a substantial decrease in the impact resistance.

III. Rheological Properties

The thermoplastic index of fluidity in hot conditions and in mass (MFR) was measured according to the NF EN ISO 1133 standard: <<Determination of the fluidity index in hot conditions of thermoplastics in mass (MFR) and volume (MVR): Method A>>.

The evolution of the fluidity index according to the load level of ashes is presented in table 15 and in FIG. 4. The test temperature is of 230° C. and the imposed load is of 2.16 kg.

TABLE 15 index of fluidity according to light ashes content

| Ashes content (%) | MFR (g/10 mn) |
|---|---|
| 0 | 25.0 |
| 10 | 17.6 |
| 30 | 11.4 |

The addition of ashes in the polymeric matrix leads to a reduction of the index of fluidity what represents an increase in the viscosity of the medium. This result is antagonistic with the observations made during the tests of extrusion and injection moulding of composite materials according to the invention described above. During these tests, the fluidity of composite materials was obviously increased by the presence of light ashes. The characterization of viscosity by determination of the melt flow rate (MFR index) not subjecting (or very little) shear stresses to the supercooled matter, we carried out rheological analyses by means of a rotational rheometer of the ARES type (Advanced Rheological Expansion System, Rheometric Scientific). The rotational rheometer is a mechanical spectrometer able to submit a sample to a dynamic deformation (sinusoidal) or stationary (linear). According to the used geometry, the mechanical properties of the material can be given by measurement of the couple resulting from the rate of imposed shearing.

Table 16 and FIG. 5 present the evolution of complex dynamic viscosity (Eta*) according to the load level of the temperature and of the angular frequency of shearing (1; 10 and 100 rad/s).

TABLE 16

| Temperature | Eta* (Pa · s) | | | | | |
|---|---|---|---|---|---|---|
| | Virgin PP | | | PP + 30% of ashes | | |
| (° C.) | 1 rad/s | 10 rad/s | 100 rad/s | 1 rad/s | 10 rad/s | 100 rad/s |
| 140 | 2762.34 | 1437.41 | 487.62 | 2225.99 | 1359.02 | 526.85 |
| 150 | 2217.17 | 1211.68 | 436.81 | 1696.27 | 1105.38 | 461.95 |
| 160 | 1798.51 | 1040.93 | 397.41 | 1312.68 | 903.18 | 409.68 |
| 170 | 1487.43 | 908.4 | 358.13 | 1040.28 | 746.21 | 358.72 |
| 180 | 1230.82 | 783.62 | 328.15 | 820.48 | 613.41 | 311.64 |
| 190 | 1094.41 | 725.76 | 323.26 | 647.57 | 499.3 | 271.7 |
| 200 | | | | 540.07 | 435.23 | 248.97 |

The measurements carried out show that by the contribution of energy in thermic form (increase in the temperature) and mechanic form (shear stress) the light ashes used act as a rheofluidifiant and explain the observations carried out during the test of implementation.

The small size of particles of ashes as their spherical morphology (cf. photo SEM of FIG. 6) induced by a thermic treatment at very high temperature allow to said ashes to be placed between the polymeric chains and thus to act on these last as the balls of a ball bearing when the polymeric matrix is in a supercooled state and subjected to shear stresses.

CONCLUSION

The addition of light ashes resulting from the combustion of de-inking sludges improves the polypropylene rigidity, as well in traction as in inflexion. The increase in these properties however will be limited by a reduction of the impact resistance. A load level of about 30% will be generally an optimal rate.

In complement of this effect of mechanical reinforcement, a shear-tinning effect is observed during the implementation of the composites (by moulding injection or extrusion in particular) and is confirmed by dynamic rheological analyses.

The invention claimed is:

1. A thermoplastic composite material characterized in that it contains a thermoplastic base resin and light ashes displaying a regular and spherical geometry, said ashes resulting from the combustion of de-inking sludge during a process including the following steps:
  selecting a mixture of fuels containing de-inking sludge resulting from papermaking industry, burning said mixture at a minimal temperature of 850° C. during 2 seconds, and collecting the light ashes with a filter or a sieve.

2. A thermoplastic composite material according to claim 1, characterized in that its mass contains 1% to 99% in mass of light ashes obtained by the combustion of de-inking sludge resulting from the papermaking industry.

3. A thermoplastic composite material according to claim 2, characterized in that its mass contains from 10% to 50% in mass of light ashes obtained by the combustion of de-inking sludge resulting from the papermaking industry.

4. A thermoplastic composite material according to claim 2, characterized in that its mass contains from 30% to 40% in mass of light ashes obtained by the combustion of de-inking sludge resulting from the papermaking industry.

5. A composite thermoplastic material according to claim 1, characterized in that the base resin is selected from polyolefin, polyamide (PA), polyethylene terephthalate (PET) and polybutylene terephthalate (PBT), polycarbonates (PC), polyphenylene oxide (PPO), polyoxymethylene (POM), polyamide-imide (PAI), polyetherimide (PEI), polyethersulfone (PES) and polyetheretherketone (PEEK).

6. A composite thermoplastic material according to claim 1, characterized in that the base resin is a polyolefin.

7. A composite thermoplastic material according to claim 6, characterized in that the base resin is a polypropylene (PP).

8. A composite thermoplastic material according to claim 1, characterized in that the base resin is a polyamide (PA).

9. A thermoplastic composite material characterized in that it contains a thermoplastic base resin and light ashes, said ashes resulting from the combustion of de-inking sludge during a process including the following steps:

selecting a mixture of fuels containing de-inking sludge resulting from papermaking industry;

burning said mixture at a minimal temperature of 850° C. during 2 seconds; and collecting the light ashes with a filter or a sieve.

10. A recycling process for de-inking sludges resulting from the papermaking industry including the following steps:

transforming de-inking sludges resulting from papermaking industry into light ashes by combustion;

collecting said light ashes with a filter or a sieve;

incorporating the light ashes thus obtained in a thermoplastic composite material according to claim 1.

* * * * *